(12) United States Patent
Schmidt

(10) Patent No.: US 11,309,595 B2
(45) Date of Patent: Apr. 19, 2022

(54) RECHARGEABLE BATTERY CELL AND METHOD FOR PRODUCING AND OPERATING A RECHARGEABLE BATTERY CELL

(71) Applicant: Bayerische Motoren Werke Aktiengesellschaft, Munich (DE)

(72) Inventor: Jan Philipp Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 16/012,981

(22) Filed: Jun. 20, 2018

(65) Prior Publication Data

US 2018/0301768 A1   Oct. 18, 2018

Related U.S. Application Data

(63) Continuation of application No. PCT/EP2016/081171, filed on Dec. 15, 2016.

(30) Foreign Application Priority Data

Dec. 21, 2015  (DE) ............. 10 2015 226 296.0

(51) Int. Cl.
*H01M 10/48* (2006.01)
*H01M 10/05* (2010.01)
(Continued)

(52) U.S. Cl.
CPC ....... *H01M 10/486* (2013.01); *H01M 10/052* (2013.01); *H01M 10/058* (2013.01);
(Continued)

(58) Field of Classification Search
None
See application file for complete search history.

(56) References Cited

U.S. PATENT DOCUMENTS 4,284,951 A     8/1981  Dahl et al.
7,831,287 B2 *  11/2010 Brister ............... A61B 5/14865
                                                    600/347
(Continued)

FOREIGN PATENT DOCUMENTS

CN       101682092 A     3/2010
CN       202094247 U    12/2011
(Continued)

OTHER PUBLICATIONS

International Search Report (PCT/ISA/210) issued in PCT Application No. PCT/EP2016/081171 dated Mar. 6, 2017 with English translation (seven pages).

(Continued)

*Primary Examiner* — Jonathan Crepeau
*Assistant Examiner* — Angela J Martin
(74) *Attorney, Agent, or Firm* — Crowell & Moring LLP

(57) ABSTRACT

A rechargeable battery cell includes a cathode, an anode, an electrolyte, and a sensor that is arranged in the rechargeable battery cell. The sensor has at least two sensor electrodes and is accommodated in the rechargeable battery cell without a sheathing at least in sections. Moreover, the at least two sensor electrodes are operated in an electrical potential range that protects the sensor and/or the sensor electrodes against corrosion by the electrolyte. A method for producing and operating a rechargeable battery cell of this kind is also provided.

13 Claims, 2 Drawing Sheets

(51) Int. Cl.
*H01M 10/42* (2006.01)
*H01M 10/0525* (2010.01)
*H01M 10/058* (2010.01)
*H01M 10/052* (2010.01)

(52) U.S. Cl.
CPC ... *H01M 10/0525* (2013.01); *H01M 10/4257* (2013.01); *H01M 10/48* (2013.01); *H01M 10/484* (2013.01); *H01M 2010/4278* (2013.01)

(56) References Cited

U.S. PATENT DOCUMENTS

| | | | |
|---|---|---|---|
| 8,423,114 B2* | 4/2013 | Simpson | C12Q 1/006 600/347 |
| 8,483,793 B2* | 7/2013 | Simpson | A61B 5/14532 600/345 |
| 2010/0085015 A1 | 4/2010 | Hamaguchi et al. | |
| 2015/0064525 A1 | 3/2015 | Henrici et al. | |
| 2015/0102821 A1 | 4/2015 | Henrici et al. | |
| 2015/0311571 A1 | 10/2015 | Krauss | |

FOREIGN PATENT DOCUMENTS

| | | | |
|---|---|---|---|
| DE | 10 2012 202 433 A1 | 8/2013 | |
| DE | 10 2012 205 937 A1 | 10/2013 | |
| DE | 10 2012 223 480 A1 | 6/2014 | |
| EP | 2 378 604 A2 | 10/2011 | |
| EP | 2378604 * | 10/2011 | ............ H01M 10/48 |
| EP | 2378604 A2 * | 10/2011 | ............ H01M 10/48 |
| JP | 5-144481 A | 6/1993 | |
| WO | WO 2009/093723 A1 | 7/2009 | |
| WO | WO 2009093723 A1 * | 7/2009 | ............. B60L 11/18 |

OTHER PUBLICATIONS

German-language Written Opinion (PCT/ISA/237) issued in PCT Application No. PCT/EP2016/081171 dated Mar. 6, 2017 (six pages).

German-language Search Report issued in counterpart German Application No. 10 2015 226 296.0 dated Sep. 6, 2016 with partial English translation (12 pages).

Chinese-language Office Action issued in Chinese Application No. 201680064162.9 dated Jul. 16, 2020 with English translation (17 pages).

* cited by examiner

RECHARGEABLE BATTERY CELL AND METHOD FOR PRODUCING AND OPERATING A RECHARGEABLE BATTERY CELL

CROSS REFERENCE TO RELATED APPLICATIONS

This application is a continuation of PCT International Application No. PCT/EP2016/081171, filed Dec. 15, 2016, which claims priority under 35 U.S.C. § 119 from German Patent Application No. 10 2015 226 296.0, filed Dec. 21, 2015, the entire disclosures of which are herein expressly incorporated by reference.

BACKGROUND AND SUMMARY OF THE INVENTION

The invention relates to an accumulator cell and to a method for the manufacture and operation of an accumulator cell.

Accumulator cells are known and have the purpose of making electrical energy available non-centrally. One advantage over other storage cells such as, for example, batteries, is that an accumulator cell is rechargeable.

The power capacity of an accumulator cell depends on many parameters, for example, on the temperature, the charge level, and the number of charging cycles that it has already executed. To better monitor the condition of an accumulator cell, sensors are arranged directly in the accumulator cells in order to measure, for example, the temperature, the resistance or the gas pressure thereof.

These sensors, however, are often exposed in the accumulator cell to an atmosphere containing electrolyte which can lead to corrosion damage at the sensors. In order to prevent such damage from corrosion, and to extend the service life of the sensors, the non-durable sensors must be protected by a cladding.

A cladding, however, is not only associated with additional costs, but often leads to poorer response behavior of the sensor. In addition, a cladding does not offer lasting and complete protection. Even small leak sites which can occur, for example, as a result of manufacturing faults or through aging processes, are sufficient to lead to corrosion damage which can cause a failure of the sensor.

The object of the invention is to provide an accumulator cell that is economical to manufacture as well as reliable.

To achieve this object, an accumulator cell is provided with a cathode, an anode and an electrolyte, as well as a sensor that is arranged in the accumulator cell and the sensor includes at least two sensor electrodes. The sensor is housed in the accumulator cell at least partially, or completely, without cladding. Moreover, the at least two sensor electrodes are operated in an electrical potential range that protects the sensor and/or the sensor electrodes from corrosion by the electrolyte. Due to a voltage opposing the corrosion potential being applied to the sensor electrodes, a corrosion of the sensor is prevented and it is possible to completely omit a protective cladding. This type of active corrosion protection constitutes a cathodic corrosion protection. Without this cathodic corrosion protection, the sensor is exposed directly to the electrolyte, and would immediately corrode and become faulty. The present invention provides the advantage of a lasting corrosion protection that offers a better response behavior to the sensor, and the manufacturing costs can be lowered.

According to one embodiment, a first sensor electrode is connected in the accumulator cell such that it is operated at the electric potential of the cathode, and/or a second sensor electrode is connected in the accumulator cell such that it is operated at the electric potential of the anode. In this way, existing electric potentials are used for the corrosion protection, thus simplifying the circuitry of the sensor.

In an example, a first sensor electrode is coupled to the cathode and is operated at the electric potential of the cathode, and/or a second sensor electrode is coupled to the anode and is operated at the electric potential of the anode. Accordingly, the sensor is directly coupled to the cathode and/or anode, and as a result, a simple and economical circuitry of the sensor is possible.

According to a further embodiment, a controller, coupled to the sensor, is present, being for instance part of the accumulator cell, where the controller drives the sensor, and the controller can be read from outside wirelessly or through provided terminals. The controller makes it possible to control the potentials of the sensor electrodes deliberately and to ensure an optimum corrosion protection. The potentials may also be directly adapted to changing marginal conditions such as, for example, the temperature or the charge state of the accumulator cell. The controller is, for example, mounted, e.g., cast, in the housing.

The sensor can be in direct contact with the electrolyte. No special precautions to prevent a direct contact with the electrolyte therefore have to be taken, and as a result, the costs are lowered and the fields of application of the sensor made more flexible.

In another embodiment, the sensor electrodes are not protected by a passive corrosion protection.

In examples, the sensor electrodes are connected in the accumulator cell such that they are operated in a potential range from greater than 0 V to 3 V, such as, from 0.1 V to 2 V, with respect to the electrolyte, since the corrosion potential is minimized in this potential range.

In yet a further embodiment, the sensor is a temperature sensor, resistance sensor, gas pressure sensor, or a strain gauge.

The accumulator cell can be a lithium ion accumulator.

To achieve the aforementioned object(s) of the invention, a method for the manufacture and operation of an accumulator cell according to the invention is also provided, having the following steps: (a) arranging the sensor in the interior of the accumulator cell so that the sensor is directly exposed to the electrolyte, (b) connecting the sensor electrodes to the anode and/or cathode of the accumulator cell, and (c) operating the sensor electrodes in an electric potential range that protects against a corrosion caused by the electrolyte.

The sensor is exposed to the electrolyte if it can interact with it—if, for example, the sensor is in direct contact with the electrolyte, or if the sensor is affected by an atmosphere containing electrolyte. "Connecting the sensor electrodes to the anode and/or cathode of the accumulator cell" means that the sensor electrodes are directly connected to the anode and/or cathode, or also that further electronic components, such as for example a controller or resistors, can be connected therebetween.

For example, the sensor electrodes are operated in a potential range from greater than 0 V to 3 V, such as from 0.1 V to 2 V, with respect to the electrolyte, since a reliable protection against corrosion is ensured in this potential range.

As is known in the case of accumulator cells, changing the poles of an accumulator cell according to the operating mode—charging or discharging—changes its electrical properties. The use of the terms anode and cathode is therefore not to be understood restrictively. The terms anode and cathode serve only to distinguish the two poles more effectively, and can be exchanged with one another in order to represent the other operating mode.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
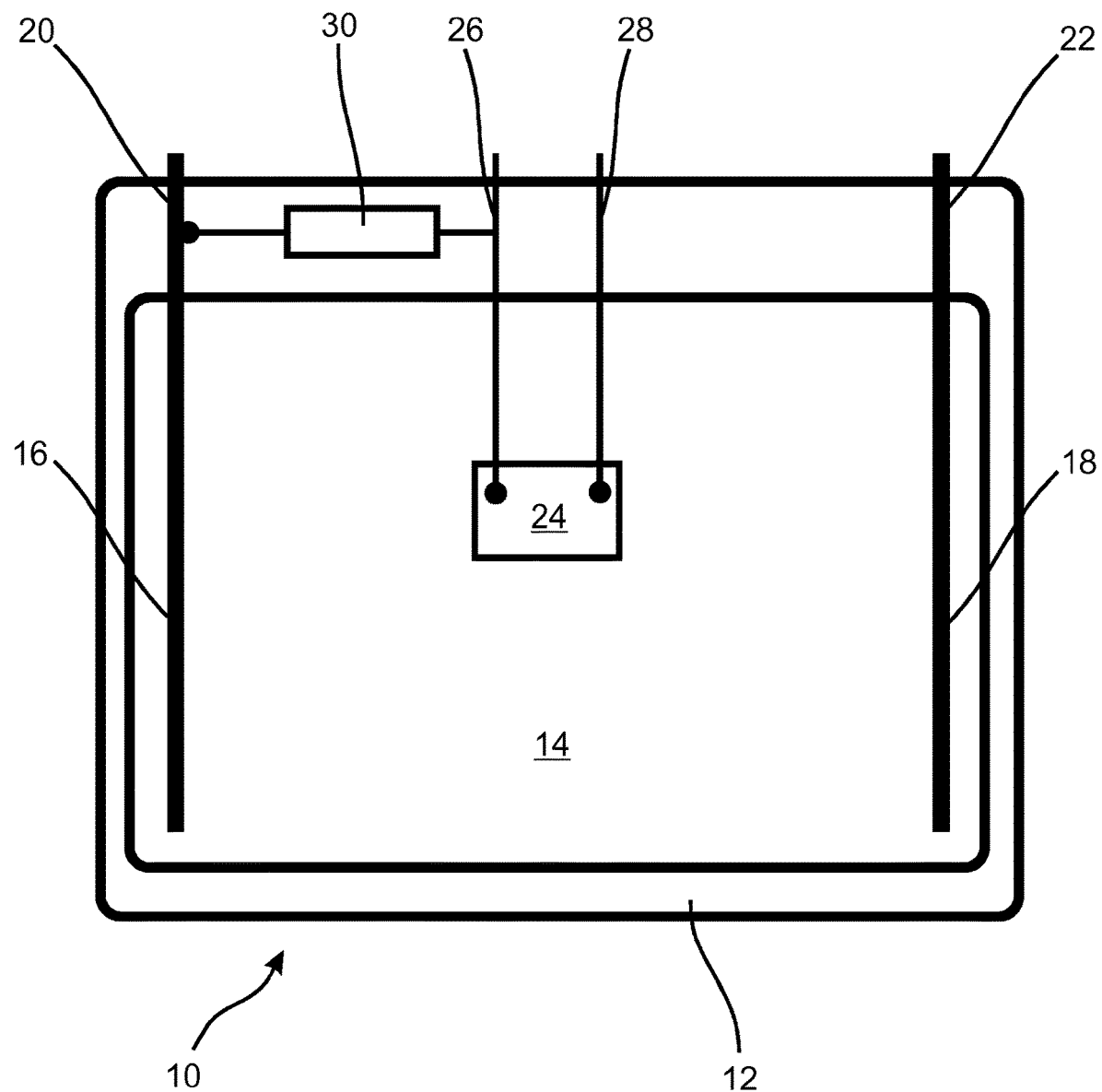
FIG. 1 illustrates a schematic view of an accumulator cell according to the invention.

An accumulator cell 10 according to the invention has a housing 12 filled with an electrolyte 14 and includes a cathode 16 as well as an anode 18 opposite to the cathode 16, as shown in FIG. 1.

The cathode 16 and the anode 18 are arranged in the electrolyte 14 and lead out of the housing 12 of the accumulator cell 10, where they form a cathode terminal 20 and an anode terminal 22.

A sensor 24 with a first sensor electrode 26 and a second sensor electrode 28 are arranged in the housing 12 of the accumulator cell 10.

The sensor 24, including its sensor electrodes 26, 28, does not include any passive corrosion protection such as, for example, a cladding, and is directly exposed to the electrolyte 14, which would otherwise destroy the sensor 24 and/or the electrodes 26, 28.

For example, the sensor 24 is a temperature sensor, resistance sensor, gas pressure sensor, or strain gauge.

The sensor electrodes 26, 28, which are provided to drive the sensor 24, are brought out of the accumulator cell 10 through the housing 12. The first sensor electrode 26 is coupled via a resistor 30 to the cathode terminal 20. The second sensor electrode 28 is operated at the electric potential of the anode 18.

Alternatively, the sensor electrodes 26, 28, may also not be coupled to the cathode 16 and the anode 18.

Figure 2:
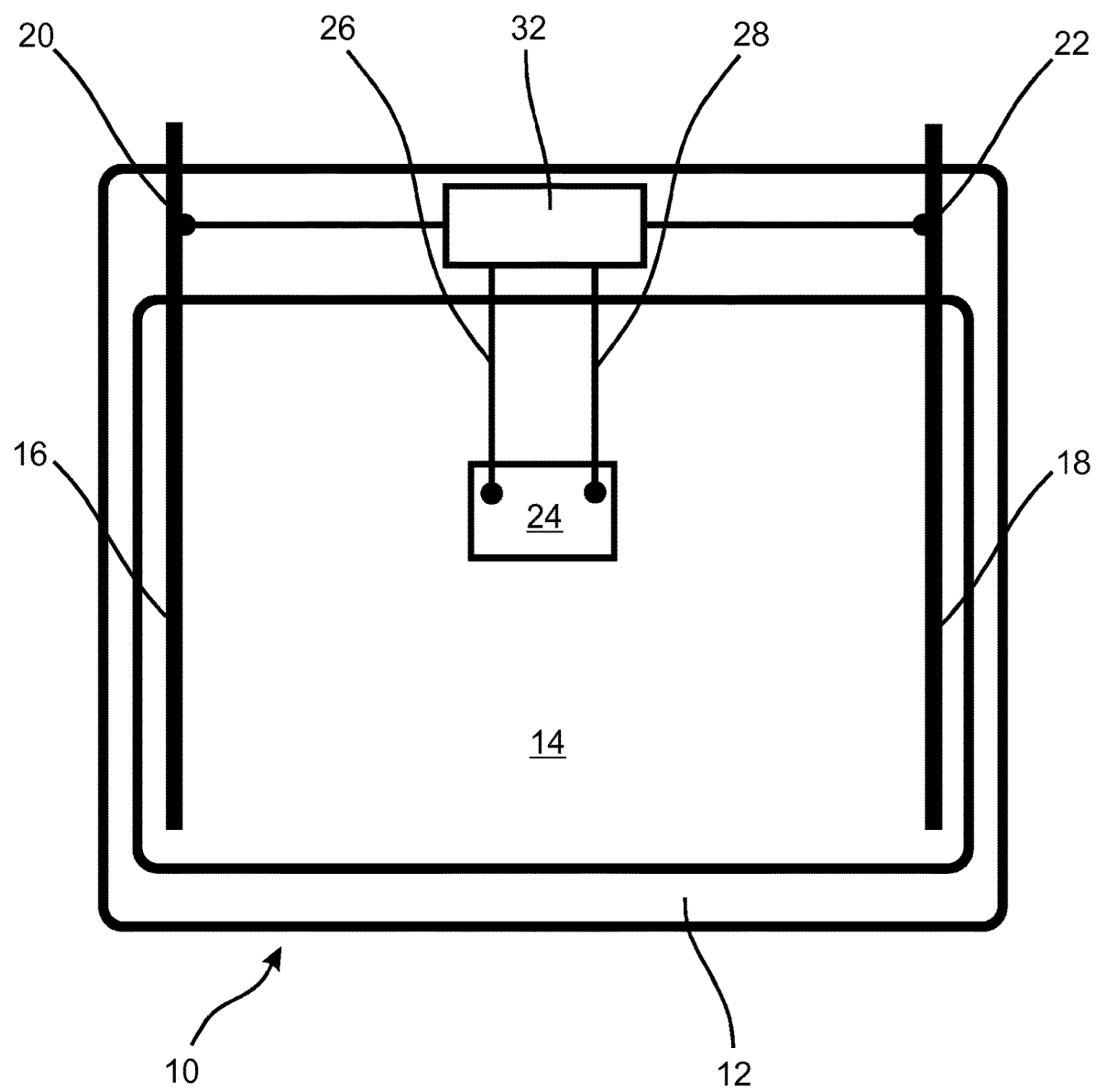
FIG. 2 illustrates a schematic view of an accumulator cell according to the invention with a controller.

An alternative embodiment of an accumulator cell 10 according to the invention has a controller 32, which is cast into the housing 12, as illustrated in FIG. 2.

The controller 32 is coupled both to the sensor electrodes 26, 28 of the sensor 24 as well as, via the cathode terminal 20 and the anode terminal 22 respectively, to the cathode 16 and the anode 18 of the accumulator cell 10. The controller 32 is provided to drive the sensor 24 and to operate it in a specific range of electric potential.

The controller 32 can, for example, be driven wirelessly or via terminals (not illustrated).

The sensor 24 can, for example, be read directly via terminals (not illustrated) or via the controller 32.

In all forms of the embodiments herein, the sensor 24 is operated in an electric potential range that protects the sensor 24 and/or the sensor electrodes 26, 28 from corrosion by the principle of cathodic corrosion protection. The sensor 24 is operated deliberately at an electric potential of the cathode 16 and/or of the anode 18, and the operating voltage of the sensor 24 is limited to a range that protects against damaging reactions with the electrolyte 14.

For example, the sensor 24 is operated in a potential range from greater than 0 V to 3 V, such as from 0.1 V to 2 V, with respect to the electrolyte 14, so that a protective current flows that leads to a cathodic polarization in the electrolyte 14 at the surface of the sensor 24, which prevents ions from being detached from the surface of the sensor 24.

If, for example, the accumulator cell 10 is a lithium ion accumulator and the sensor 24 is a sensor with copper sensor electrodes 26, 28, then, through the operation of the sensor electrodes 26, 28 at the electric potential of the anode 18, and through the application of an operating voltage of, for example, 2 V to the sensor 24, the redox potential of the copper sensor electrodes 26, 28 is drawn to a reducing potential which prevents damage to the sensor electrodes 26, 28 through corrosion.

The object of the invention is not, however, limited to the abovementioned accumulator types and materials. The use of the cathodic corrosion protection is, rather, possible for all sensors 24 in accumulator cells 10 which can be operated in a suitable range of electric potential with respect to the electrolyte 14 that prevents a corrosion of the sensor 24.

Alternatively, the sensors 24 or the sensor electrodes 26, 28 can be partially cladded, where the sensor 24 is operated in an electric potential range with respect to the electrolyte 14 that prevents corrosion thereof and thus damage to the sensor 24 and/or the sensor electrodes 26, 28.

The manufacture and operation of the accumulator cell 10 according to the invention proceeds according to the following steps: (a) arranging the sensor 24 in the interior of the accumulator cell 10 so that the sensor 24 is directly exposed to the electrolyte 14, (b) connecting the sensor electrodes 26, 28 to the anode 18 and/or cathode 16 of the accumulator cell 10, and (c) operating the sensor electrodes 26, 28 in an electric potential range that protects against a corrosion caused by the electrolyte 14.

Through the application of the principle of active cathodic corrosion protection, it is ensured that the sensor 24 can be operated in the accumulator cell 10 in direct contact with the electrolyte 14, without resulting in damage to the sensor 24 by corrosion, even when the sensor 24 does not include any passive corrosion protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An accumulator cell comprising:
   a cathode arranged at a first end of the accumulator cell;
   an anode arranged at a second end of the accumulator cell that is opposite to the first end;
   an electrolyte arranged inside of the accumulator cell; and
   a sensor having at least two sensor electrodes,
   wherein the sensor is arranged in a central portion of the accumulator cell and is completely surrounded by and in direct contact with the electrolyte except for end portions of the at least two sensor electrodes which project outside of the electrolyte,
   wherein the at least two sensor electrodes are operated in an electrical potential range that protects the sensor and/or the sensor electrodes from corrosion by the electrolyte,
   wherein the accumulator cell, in which the sensor is arranged, is a lithium ion accumulator, and wherein a housing of the sensor is completely surrounded by and directly in contact with the electrolyte.

2. The accumulator cell according to claim 1, wherein a first sensor electrode is connected in the accumulator cell such that it is operated at an electric potential of the cathode, and/or a second sensor electrode is connected in the accumulator cell such that it is operated at an electric potential of the anode.

3. The accumulator cell according to claim 1, wherein a first sensor electrode is coupled to the cathode and operated at an electric potential of the cathode, and/or a second sensor electrode is coupled to the anode and operated at an electric potential of the anode.

4. The accumulator cell according to claim 1, further comprising a controller, wherein the controller is coupled to the sensor and configured to drive the sensor.

5. The accumulator cell according to claim 1, wherein the at least two sensor electrodes are not protected within the electrolyte by a passive corrosion protection.

6. The accumulator cell according to claim 1, wherein the at least two sensor electrodes are wired in the accumulator cell such that they are operated in a potential range from greater than 0 V to 3 V with respect to the electrolyte.

7. The accumulator cell according to claim 1, wherein the sensor is a temperature sensor, resistance sensor, gas pressure sensor, or a strain gauge.

8. A method for the manufacture and operation of an accumulator cell, the method comprising the acts of:

arranging a sensor in an interior of the accumulator cell so that the sensor is directly exposed to electrolyte in the accumulator cell;

connecting sensor electrodes of the sensor to an anode and/or a cathode of the accumulator cell; and operating the sensor electrodes in an electric potential range that protects against corrosion caused by the electrolyte;

wherein the accumulator cell, in which the sensor is arranged, is a lithium ion accumulator; and wherein a housing of the sensor is completely surrounded by and directly in contact with the electrolyte.

9. The method according to claim 8, wherein the sensor electrodes are operated in a potential range from greater than 0 V to 3 V with respect to the electrolyte.

10. The accumulator cell according to claim 1, wherein the sensor is housed in the accumulator cell at least partially without cladding.

11. The accumulator cell according to claim 4, wherein the controller is read wirelessly and/or through provided terminals.

12. The accumulator cell according to claim 6, wherein the potential range is 0.1 V to 2 V.

13. The method according to claim 9, wherein the electric potential range is from 0.1 V to 2 V.

* * * * *